W. C. FARNUM.
FEEDER FOR BORING AND TURNING MACHINES.
APPLICATION FILED JULY 25, 1913.

1,164,272.

Patented Dec. 14, 1915.
4 SHEETS—SHEET 1.

Witnesses,
Rowell F. Hatch.
Beatrice T. Smith.

Inventor,
William C. Farnum
by Robt. F. Hain

UNITED STATES PATENT OFFICE.

WILLIAM C. FARNUM, OF WINCHENDON, MASSACHUSETTS, ASSIGNOR OF ONE-HALF TO HENRY E. COWDREY AND CHARLES F. COWDREY, OF FITCHBURG, MASSACHUSETTS.

FEEDER FOR BORING AND TURNING MACHINES.

1,164,272. Specification of Letters Patent. Patented Dec. 14, 1915.

Application filed July 25, 1913. Serial No. 781,113.

*To all whom it may concern:*

Be it known that I, WILLIAM C. FARNUM, a citizen of the United States, residing at Winchendon, county of Worcester and State of Massachusetts, have invented an Improvement in Feeders for Boring and Turning Machines, of which the following description, in connection with the accompanying drawings, is a specification, like letters on the drawings representing like parts.

The invention to be hereinafter described relates to wood boring and turning machines wherein wooden blanks are bored and the exterior surface turned and finished in the formation of the completed product, such as handles and the like; and more particularly the present invention relates to means for feeding the blanks and transferring them from station to station for treatment.

The aims and purposes of the present invention are to provide feeding means in a machine of the above general type which shall be simple in construction and effective and economical in operation, and wherein the parts and their association shall be such that wooden pieces may be fed in succession to be bored and then to a position where they may be turned where they shall be released.

These and other objects of the present invention will best be made clear from the following description and accompanying drawings of one form of means for carrying the invention into practical effect, it being understood that in details the various parts and their relations may be modified within the true scope of the invention, which is definitely pointed out and defined by the claims.

Figure 1:
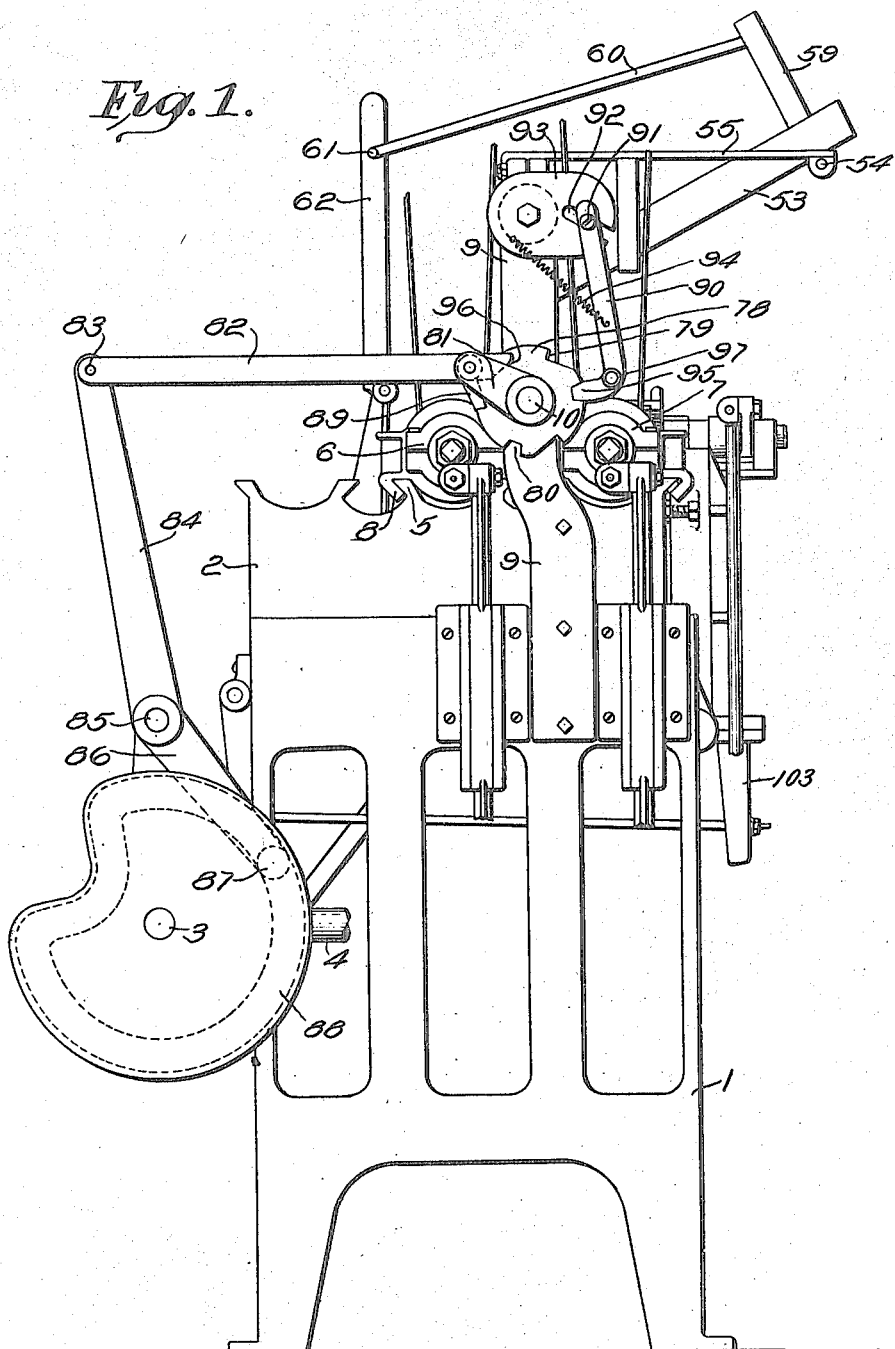
Figure 2:
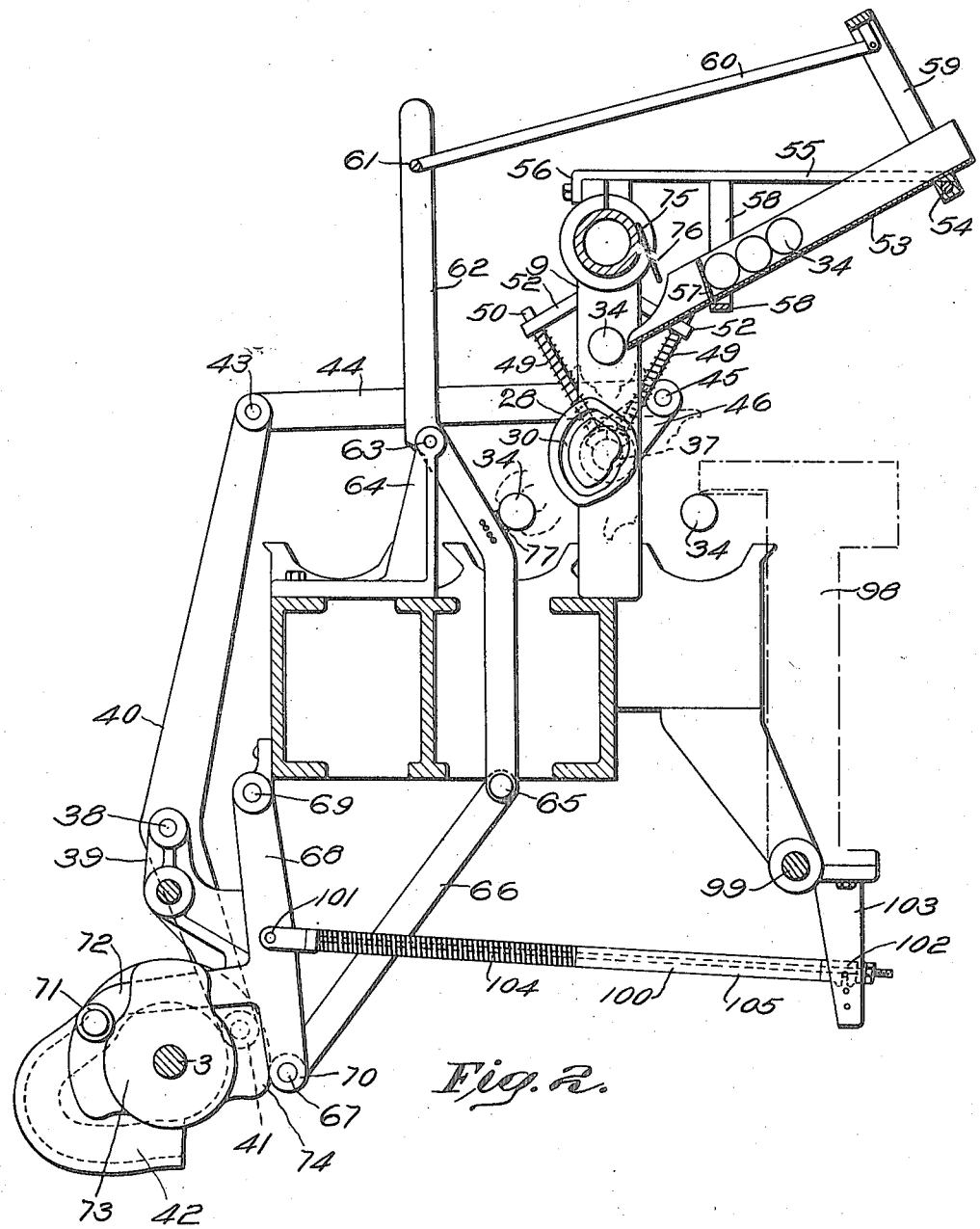
Figure 3:
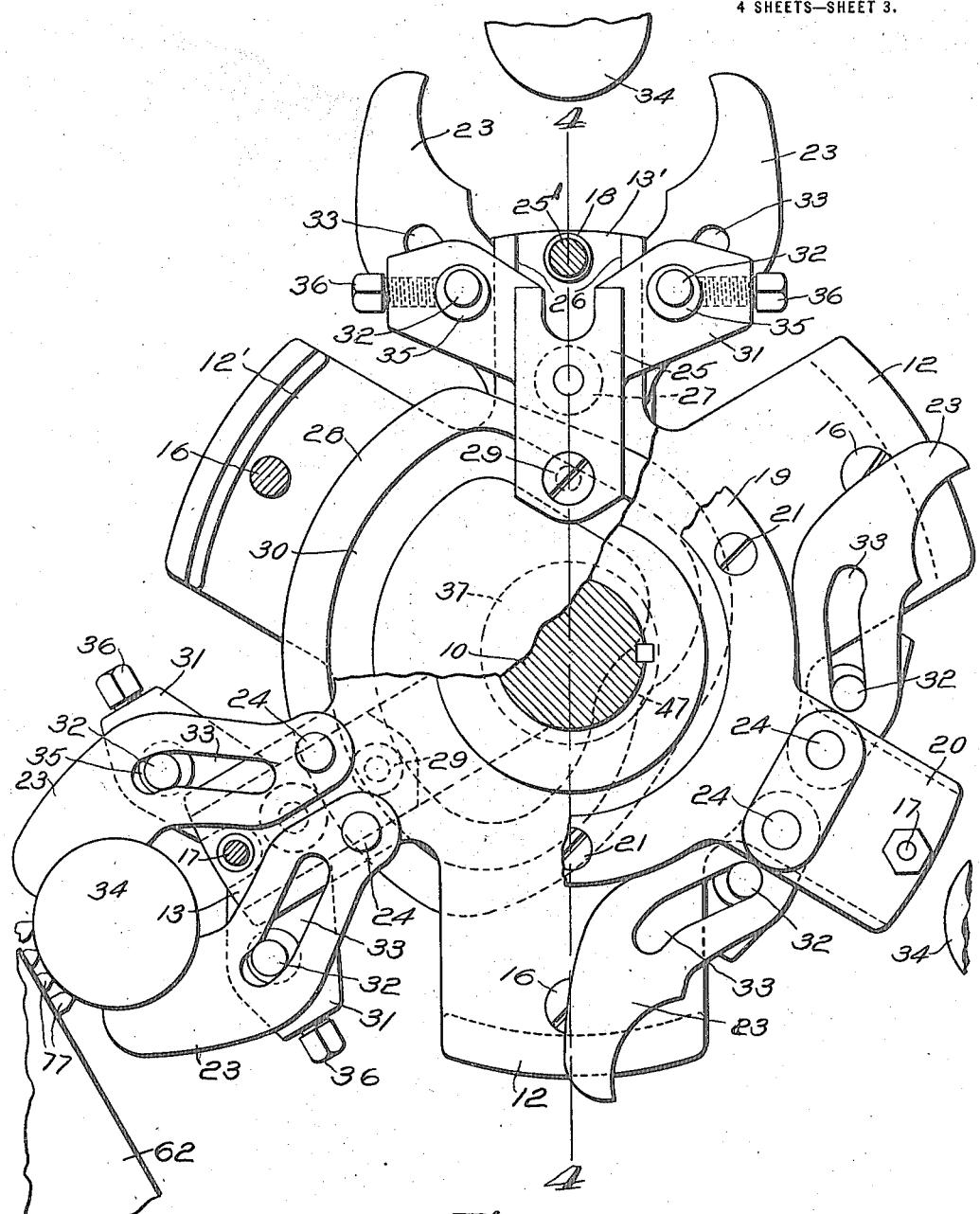
Figure 4:
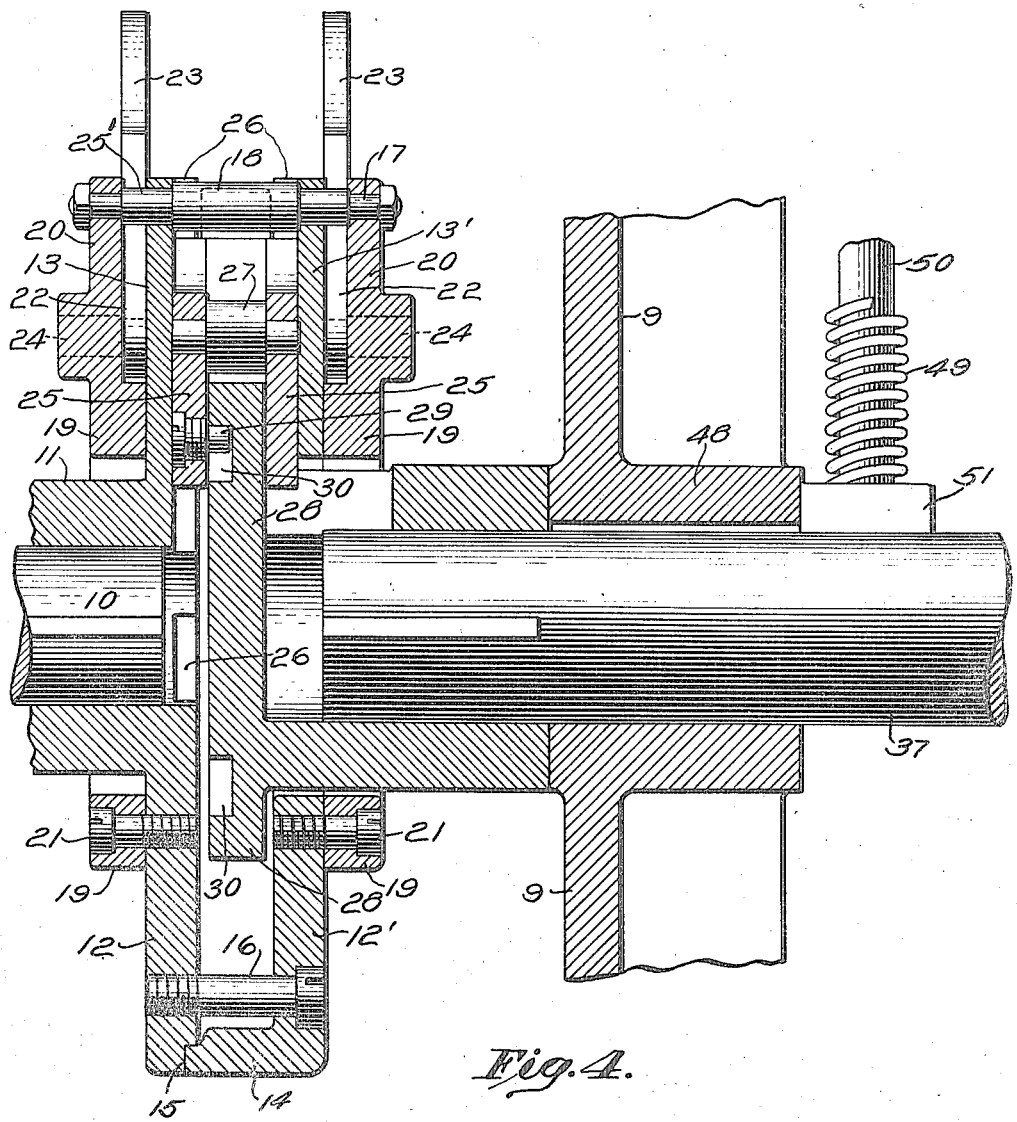

In the drawings:—Figure 1 is a side view of a boring and turning machine for making handles, such for instance, as are used for manipulating hand tools, said machine being provided with the feeding means of the present invention; Fig. 2 is a central cross-section of the machine shown by Fig. 1, showing the hopper or trough operating mechanism and the movable cam for operating the jaws of the feeder; Fig. 3 is an enlarged detached view of the feeder showing details constituting a good practical form of the present invention, with parts broken away; and Fig. 4 is an enlarged section on the line 4—4, Fig. 3.

The drawings herewith show the present invention associated with a boring and turning machine of the type shown and described in a prior application filed by me January 10, 1912, Serial No. 670,398, and reference may be had thereto for full disclosure of the boring and turning operations, but it is to be understood that the invention is not restricted to such type of machine.

Referring to Fig. 1, the machine frame may be of any approved or appropriate form and, as in the application referred to, comprises supporting end frames 1, sustaining the machine bed 2. Journaled in the main frame is the main driving shaft 3 which may be driven in any suitable manner from a convenient source of power, and operatively connected thereto are the side cam shafts 4, Fig. 1, substantially as and for the purpose as fully described in said prior application.

The feeding device of the present invention contemplates the adaptation for use in a machine for simultaneously boring and turning different blanks, that is to say, while one blank is being bored another is being turned and finished, and to this end the appropriate boring heads and turning heads are preferably arranged in pairs alongside of each other, so that when a blank has been bored, it may be conveniently transferred to the turning heads and the exterior turned and finished. In the illustrated form of the invention, it is shown in connection with one pair of boring heads and one pair of turning heads arranged side by side, but obviously a greater number of pairs of boring and turning heads may be conveniently assembled in operative relation with feeding devices of the present invention within the true scope thereof.

The machine bed 2 at opposite side portions is provided with suitable ways 5, Fig. 1, on which slide the boring and turning head stocks 6 and 7. These ways, only one of which is shown in Fig. 1, may be formed by upwardly projecting inclined portions which are engaged by downwardly converging portions 8 of the head stock frames, substantially as set forth in full in said prior application. The head stocks for the boring and turning heads may be of any appropriate character and be operated in the well-known way for properly boring and then turning the bored blanks, and for convenience they are herein shown of the type set forth in said prior application.

Rising from the main frame are the standards 9 for supporting part of the feeder for the blanks, said standards, as shown, being preferably disposed between the longitudinal axis of the boring and turning heads 6 and 7, Fig. 1, so that the blanks may be first delivered to the boring station as will more fully appear.

Mounted in a suitable bearing in a standard 9 is the feed shaft 10, Figs. 1 and 4, carrying the blank engaging means which takes a blank from a source of supply and delivers it first to the boring head where the blank is held from rotation until properly bored, and then carries it to the turning station, where, after the turning centers have properly engaged the blank, the said feeding means releases the blank that it may be turned.

It is appropriate at this time to describe the character of the feeder, the preferred structure of jaws, and their operating means, as best indicated by Figs. 3 and 4. The jaws are mounted in pairs upon pivotal points carried by a jaw carrier rotatable with the feeder shaft 10, and said jaws are appropriately opened and closed at proper times to take a blank and deliver it successively to the boring and turning stations, as above indicated. As one means for carrying this feature into practical effect, the shaft 10, Figs. 3 and 4, has splined or otherwise secured thereto, a hub 11 carrying the two sets of radial arms 12 and 13, Figs. 3 and 4. Opposed to the arms 12 and 13 are the similar arms 12' and 13', the said parts being connected together with a space between, as indicated by Fig. 4. The arms 12 and 12' which project from the hub 11 may be formed as shown in Fig. 3 with a flange 14 on one of said parts engaging a recess 15 in the other, said parts being connected by suitable means such as the bolts 16, Fig. 4. Likewise, the arms 13 and 13', Fig. 3, are spaced apart and held in such spaced relation by a bolt 17 having a spacer or sleeve 18 against the ends of which the inner surfaces of the arms 13 and 13' bear, as will more fully appear, the construction being such that the series of arms or segment plate portions 12, 12', and 13, 13', form a series of box-like projections extending radially of the feed shaft 10.

Exterior of the arms or segment portions 13 and 13' are the jaw carriers, which may conveniently be formed as ring portions 19 having radial arms 20 corresponding to the arms or segment portions 13, 13' and preferably secured by the bolts 21 to the arms of the hub 11, the construction being such that as the shaft 10 rotates, the series of box-like projections formed by the arms 13, 13', and 12, 12', likewise rotate and perforce the jaw carriers likewise rotate.

Between the jaw carriers 20 and the outer face of the arms or segments 13, 13' a recess is formed, preferably in the jaw carriers 20, as indicated at 22, Fig. 4, for the reception of the jaws 23 pivotally mounted on the pins 24, Figs. 3 and 4, carried by the jaw carriers or arms 20. The jaws 23 are preferably arranged in pairs, two of such pairs forming the blank grasping means, although the number of such jaws may be varied.

Referring to Fig. 4, it will be noted that while the bolts 17 serve to hold or brace the outer end portions of the jaw carriers 20, a sleeve 25' extending between the inner faces of the jaw carriers serves to maintain them a proper distance apart to provide free movement of the jaws 23 in their opening and closing movements, as will presently appear. In the form of invention shown, there are three sets of jaws, but it will be understood that the number may be varied to suit conditions of use.

The jaw operating means for opening and closing the jaws comprises a slide formed preferably of two members 25, 25 mounted in suitable guideways 26, 26, formed in the inner surfaces of the arms 13, 13', Fig. 4. Between the members 25, 25 is a roll 27 adapted to bear upon the peripheral portion of a cam 28, and extending from one of the slide members 25, Fig. 4, is a pin 29 adapted to engage the cam path 30, the construction being such that upon relative rotative movement of the cam and slides 25, 25 about the axis of the feed shaft 10, the roll 27 will cause said slides to move outward and the pin 29 will cause them to move inward in conformity with the shape of the respective cams 28 and 30.

The slides 25 carry projections 31, Fig. 3, on which are mounted the jaw opening and closing pins 32, which engage slots or openings 33 in the adjacent jaws 23, the form of the said slots or openings 33 being such that upon outward movement of the slides 25 the pins 32 will cause the jaws to close and on inward movement will cause the jaws to open to grasp and release the blank 34 respectively.

The grasping surface of the jaws 23 are appropriately formed to engage a blank, and in the present form of the invention the blanks are supposed to be of general cylindrical form. These blanks, however, will vary in size, of course, according to the size of the handle to be bored and turned therefrom, and to adapt the jaws for engagement with different sizes of blanks, the jaw opening and closing pins 32 carried by the projections on the slides 25 are mounted eccentrically in the said projections as indicated in Fig. 3. That is to say, the pins 32 have a base portion 35 mounted in the projections 31, said base 32 being eccentric with respect to the base portions 35. In order to hold the pins 32 in adjusted position, suitable means are formed to lock the said pins in the projections 31, the means indicated by the form of the present invention being the clamping screws 36 adapted to be seated against the cylindrical surface of the portion 35 of said pins 32, the construction being such that upon loosening the clamping screws 36 the base portions 35 may be turned in the projections 31 of the slides 25 to appropriately adjust the pins 32 in order that their coöperation with the slots 33 of the jaws may vary the opening and closing movements of said jaws to suit blanks of different sizes. In other words, the jaws 23 have a predetermined opening and closing movement, and said predetermined opening and closing movement may be varied by the adjustment of the pins 32 substantially as hereinbefore noted.

As hereinbefore suggested, the feeding device of the present invention contemplates taking blanks from a source of supply, carrying them to a boring or drilling station, and holding them from rotary movement during the drilling or boring operation, and then to carry them to a turning station, where after the turning centers have grasped the ends of the blank, the jaws release the blank and free it to rotative movement. Inasmuch as the jaws must hold the blank at the turning station until the turning centers have grasped the ends of the blank, special arrangement must be made for opening the jaws at that station while the jaws at the other stations shall maintain their receiving or blank holding relations. To this end the cam 28, Fig. 4, is mounted and fixed to rotate with a shaft 37, and when a pair of jaws holding a blank has reached the blank turning station indicated at the right, Fig. 3, and after the blank has been brought to rest between the turning centers and the centers have engaged the ends of the blank the cam 28 is given a rotary movement contra-clockwise, Fig. 3, to open the jaws and release the blank, the formation of the cams 28 and 30 being such that during this movement of the cam 28 the jaws at the receiving and at the boring or drilling station remain in their receiving and blank holding relations. This movement of the cam 28 and its return to initial position is effected through the mechanism best indicated by Fig. 2. Mounted at 38, Fig. 2, on a bracket 39 secured to the machine frame is a lever 40, the lower end being provided with a roll 41 engaging a path cam 42. Pivotally connected to the upper end of the lever 40 at 43 is a cam operating arm 44, the end of which is connected at 45 to an arm 46 secured to a cam operating shaft 37, Figs. 2 and 4, said shaft 37 being the same shaft upon which the cam 28 is mounted, the construction being such that upon rotary movement of the shaft 3 carrying the path cam 42 the cam 28 will be suitably moved through the shaft 37 to cause the jaws 23 at the blank turning station to be freed from their engagement with the blank after the turning centers have engaged the ends of said blank. It is desirable also that the jaws 23 at the turning station, at the right, Fig. 3, shall be drawn well back and to this end the path cam 30 has an abrupt reëntrant portion 47, Fig. 3, which, acting upon the pin 29 carried by the slides 25, will cause the pins 32 to open the jaws 23 substantially as indicated in Fig. 3. When the blank has been turned the feed shaft 10 is rotated and at the same time or approximately therewith, the cam 28 is given a reverse movement, whereby the blank 34 at the receiving station, at the top, Fig. 3, is engaged and grasped by the receiving jaws and upon rotation of the feed shaft the blank thus engaged is carried to the boring or drilling station, while the blank formerly at the boring and drilling station at the left, Fig. 3, is carried to the turning station.

It is desirable that when the jaws grasp the blank and carry it to the various stations where it is to be treated, that they do not crush or injure the surface of the blank, and to this end the shaft 37 carrying the cam 28 is yieldingly mounted, so that upon actuation of the jaws through said cam, should said jaws engage and be resisted by the blank, the shaft will yield laterally to prevent undesirable crushing of the blank. As one means to this end the shaft 37 is loosely mounted in its bearings 48, Fig. 4, and is normally under the influence of the springs 49 carried by the rods 50 and having the shoe 51 bearing upon the upper portion of the shaft 37 as best indicated in Figs. 2 and 4. The upper ends of the springs 49 bear against suitable abutments 52 projecting from the standard 9, Fig. 2, the construction being such that after the blank has been grasped by the jaws, any crushing movement of the jaws about the blank will react through the yielding shaft to prevent injury to the blank.

The present invention contemplates, also, an automatic supply of the blanks to the feeding device and one form of such means is well indicated by Fig. 2. In said figure, the blanks 34 are placed in a trough 53 pivotally mounted at 54 upon an arm 55 secured at 56 to the top of the standard 9. The trough 53 has an opening in its bottom through which projects a gate 57 fixed to a stationary support 58 carried by the fixed arm 55 as indicated in Fig. 2, the construction being such that the blanks 34 in the trough 53 will normally rest with the endmost blank against the gate 57. Secured to the trough 53 and projecting therefrom is an operating arm 59 connected to a link 60 which is itself jointed at 61 to the upper end of a lever 62 pivotally mounted at 63 to a bracket 64 secured to the machine frame. The lower arm of the lever 62 is connected at 65 to a link 66 jointed at 67 to a rocker arm 68 pivoted at 69 to the machine frame. The rocker arm 68 is provided with the rolls 70 and 71, the latter being mounted on a projecting arm 72 extending from the rocker arm 68. The rolls 70 and 71 engage respectively the periphery of the cams 73 and 74, said cams being appropriately formed to positively move the rocker arm 68 in its two directions of rocking movement, the construction being such that upon actuation of the rocker arm 68, the lever 62 and perforce the trough 53, will be raised and lowered about its pivotal axis at 54, thereby in its upward movement raising the trough so that the endmost blank 34 may move downward over the gate, which by such movement of the trough, is removed from the path of the blank. To insure delivery of a single blank, there is mounted upon the machine frame at 75, a stop 76, said stop being so related to the trough and gate 57 that when the trough is raised and the blanks moved downward therein, the stop 76 obstructs the passage of the blanks, and as the trough is lowered the gate 57 passes between the endmost blank and the blank next adjacent thereto, thereby delivering, upon the downward movement of the trough, a blank 34 to the open jaws at the receiving station of the feeder.

As hereinbefore indicated, when the blank is positioned at the boring or drilling station, at the left, Fig. 3, it is held by the jaws from rotation while the boring or drilling tools act upon the blank. To assist in preventing rotary movement of the blank at this time, the present invention contemplates blank engaging means, which in connection with the jaws, effectively prevent rotation of the blank. In the form of the invention shown, this blank engaging means is in the form of pins or projections 77, Figs. 2 and 3, which are preferably mounted upon the lower portion of the lever 62, the construction being such that when a blank is at the boring or drilling station the lever 62 has been moved into position to cause the blank engaging pins 77 to engage the peripheral portions of the blank and effectively assist in preventing rotation thereof. Of course it is obvious to those skilled in the art that the details in many respects may be varied from those described, within the true scope of the invention.

To rotate the feed shaft step-by-step, and to hold it from rotary movement during the treating of the blanks, the present invention contemplates the feed shaft rotating means and a lock, which in the present form of the invention, are best illustrated by Fig. 1.

The feed shaft 10 has secured thereto the combined ratchet and lock disk 78, Fig. 1, having the ratchet teeth 79 and the locking recesses 80, and loose upon the shaft is an arm 81 connected at its free end with a link 82 which is itself jointed at 83 to the upper portion of a lever 84 pivoted at 85 and having an arm 86 provided with a roll 87 to engage a cam path 88 in a suitable cam secured to the shaft 3, the construction being such that upon rotation of the shaft 3 the lever 84 will be locked upon its pivot 85 to thereby move the link 82 and the pawl 89 carried by the free end of the arm 81 first in one and then in the opposite direction, as will be readily understood. The pawl 89 is formed to engage the ratchet teeth 79 as the link 82 moves to the left and thereby rotate the feed shaft 10 an appropriate distance to carry the feed jaws from one station to the next succeeding station.

In order to lock the feed shaft from rotation when the blanks have been moved to their respective stations and are under treatment, there is a lock arm 90, Fig. 1, adjustably pivoted at 91 in the slot 92 of a bracket 93 secured to the standard 9, Fig. 1. The lock arm 90 is under the influence of a spring 94, whereby the end 95 of said arm is normally forced inward or to the left, Fig. 1, to engage one of the locking recesses 80 in the disk 78.

In order to disengage the lock end 95 from the locking recess 80 as the link 82 moves to the right and thereby permit rotary movement of the disk 78 contra-clockwise, the end of the link 82 is provided with a cam surface 96, Fig. 1, which, upon movement of the link 82 to the right, is adapted to engage a projection or roll 97 on the lock arm 90 and thereby disengage the lock from the disk, the construction being such that upon reverse movement of the link 82, the disk will be turned sufficiently before disengagement from the pin or roll 97 to prevent reengagement of the lock end 95 with the locking recess so that a complete, full movement may be given to the feed shaft. When such feed movement has been completed, however, the spring 94, acting upon the lock arm 90 forces the end 95 into a locking recess 80, thereby effectively locking the feed shaft from rotary movement.

Referring to Fig. 2, the knife carrier for the turning and finishing operations is indicated at 98, said carrier being pivoted at 99 and appropriately turned about said pivot 99 by suitable operating means such as the link 100, one end of which is connected at 101 to the lock arm 68 and the other end at 102 to a pin or other projection extending from the arm 103. The operating link 100 is preferably formed so as to yield by means of a spring 104 and a sleeve 105, the latter of which directly engages one of the pins 102 on the arm 103, the construction being such that the knife carrier may be yieldingly moved to position the knives for the turning operation.

Changes, of course, may be made in the details of structure of the various features hereinbefore described, without departing from the true scope of the actual invention, which is definitely set forth by the claims.

What is claimed is:—

1. The combination of a plurality of spaced means for treating a blank, of a rotatable feeder disposed between said spaced means and comprising a plurality of sets of blank engaging jaws, a source of blank supply, means including a slide movable radially with relation to the feeder and connected to each jaw of a set for causing the jaws to engage and carry a blank to one of said spaced means and hold it during treatment thereby and then to move the blank to another of said spaced means, and for causing the jaws adjacent the last mentioned means to hold the blank until the last mentioned means has taken control of the blank, and means to then move the slide radially to operate both jaws of a set to move said jaws away from the blank while maintaining the jaws adjacent the first mentioned means in holding relation with the blank there being treated.

2. The combination of a plurality of spaced means for treating a blank, of a rotatable feeder disposed between said spaced means and comprising a plurality of sets of blank engaging jaws, a source of blank supply, means including a slide movable radially of the feeder and engaging both jaws of a set for causing the jaws to engage and carry a blank to one of said spaced means and hold it during treatment thereby, and then to move the blank to another of said spaced means, means in addition to the jaws to engage the blank while being treated by the first mentioned means to assist in preventing rotation of said blank, and means for holding the slide from radial movement when the jaws are adjacent the means for the second treatment of the blank to hold the blank until the first mentioned means has taken control of the blank, and to then move the slide radially to release said jaws from the blank while maintaining the jaws adjacent the first mentioned means in holding relation with the blank there being treated.

3. The combination of a plurality of spaced means for treating a blank, of a rotatable feeder carrying pairs of pivotally mounted jaws, a slide movable radially of the feeder and connected to each jaw of a pair, a cam mounted concentrically of the feeder acting upon the slide to lock both jaws in blank holding position until after one of said means has taken control of the blank and thereafter withdrawing the slide radially of the feeder to separate and move both jaws away from the blank.

4. The combination of a plurality of spaced means for treating a blank, of a rotatable feeder having pairs of pivotally mounted jaws, a slide movable radially of the feeder, a pin and slot connection between the slide and each jaw of a pair, and a cam mounted concentrically of the feeder for locking the jaws in blank holding relation until one of said means has taken control of the blank and then moving the slide radially to release the blank.

5. The combination of a plurality of spaced means for treating a blank, of a feeder comprising jaws for engaging a blank and carrying it successively to said spaced means, means for closing and opening the jaws, said jaw closing and opening means comprising a yieldingly mounted shaft, and a cam mounted on said shaft and having operating engagement with the jaws of the feeder.

6. The combination of a plurality of spaced means for treating a blank, of a feed shaft carrying a series of arms, jaws pivotally mounted on said arms for engaging a blank, a cam mounted for yielding movement in a direction transversely of its axis, means for turning the feed shaft to carry the jaws into position for treatment at two of the stations, a slide connected to the jaws and yieldingly operated by the cam as the feed shaft is rotated for closing said jaws, and means for operating the cam for opening the jaws at the station where the blank is last treated.

7. The combination of a plurality of spaced means for treating a blank, of a feeder comprising a shaft, arms carried by said shaft, jaws pivotally mounted on said arms, jaws operating slides, a cam shaft independent of the feeder shaft carrying a jaw slide operating cam, means for turning the feed shaft relatively to the said cam for causing the latter to close the jaws, means for moving the cam independent of feed shaft movement for opening the jaws at one of said means, said cam being laterally movable to prevent injury to the blank by the jaws.

8. The combination of tools for acting upon a blank, a feeder for presenting the blanks to said tools, said feeder comprising a feed shaft, radial arms carried by said shaft, jaws pivotally mounted on said arms and provided with slotted portions, a slide movable radially of the feed shaft and having pins engaging said slotted portions of the jaws for opening and closing the jaws, and a cam acting on said slide for positively opening and closing said jaws.

9. In a machine of the character described, a feeder, comprising a feed shaft, jaws pivotally connected to the feed shaft for closing and opening movement to engage and release a blank, said jaws each being provided with a slot, a slide having pins engaging said slots, said pins being adjustable to suit blanks of different sizes, means for clamping the pins in adjusted position, a cam for operating said slide, and means for rotating the feed shaft.

10. In a machine of the character described, the combination of a feed shaft, a plurality of pivotally mounted jaws carried by said shaft, a radially movable jaw operating member for opening and closing said jaws, a cam, means for turning the feed shaft relative to said cam to cause the jaws to hold and carry a blank from one station to another, a cam shaft carrying said cam independent of the feed shaft, said cam shaft being yieldingly mounted for lateral movement, and means for rocking the cam to cause the jaws at one of said stations to release the blank while the jaws at the other stations remain unaffected by movement of said cam.

In testimony whereof, I have signed my name to this specification, in the presence of two subscribing witnesses.

WILLIAM C. FARNUM.

Witnesses:
ELLIOT S. TUCKER,
ARTHUR F. EVANS.